Oct. 16, 1956          B. G. ELLIOTT          2,766,673
ADJUSTING MECHANISM FOR AGRICULTURAL IMPLEMENT PARTS
Filed Sept. 29, 1951          2 Sheets-Sheet 2
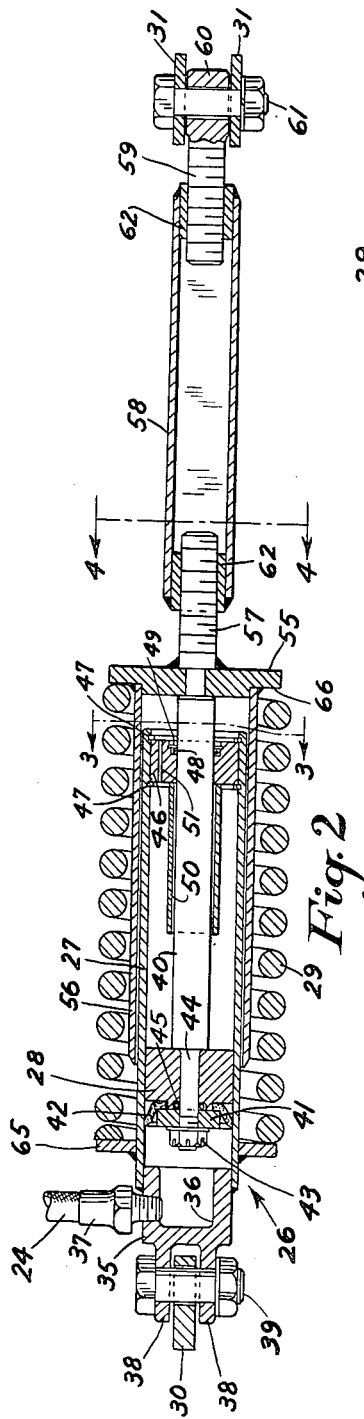
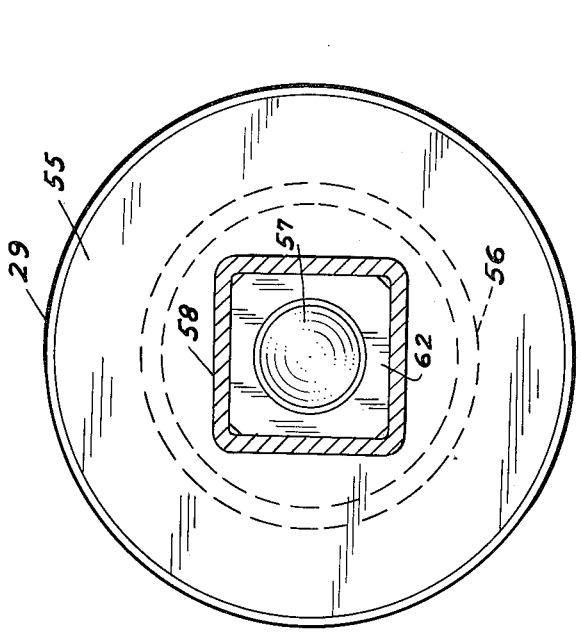
Fig. 4
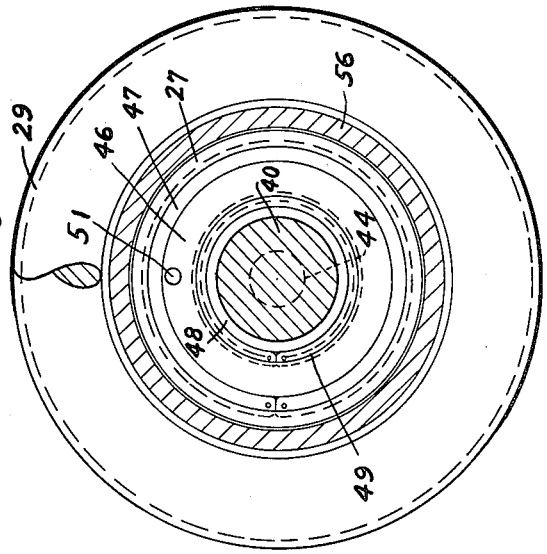
Fig. 3
INVENTOR.
BRANTFORD G. ELLIOTT
BY Carlson, Pitzner
Hubbard & Wolfe
ATTORNEYS United States Patent Office 2,766,673
Patented Oct. 16, 1956

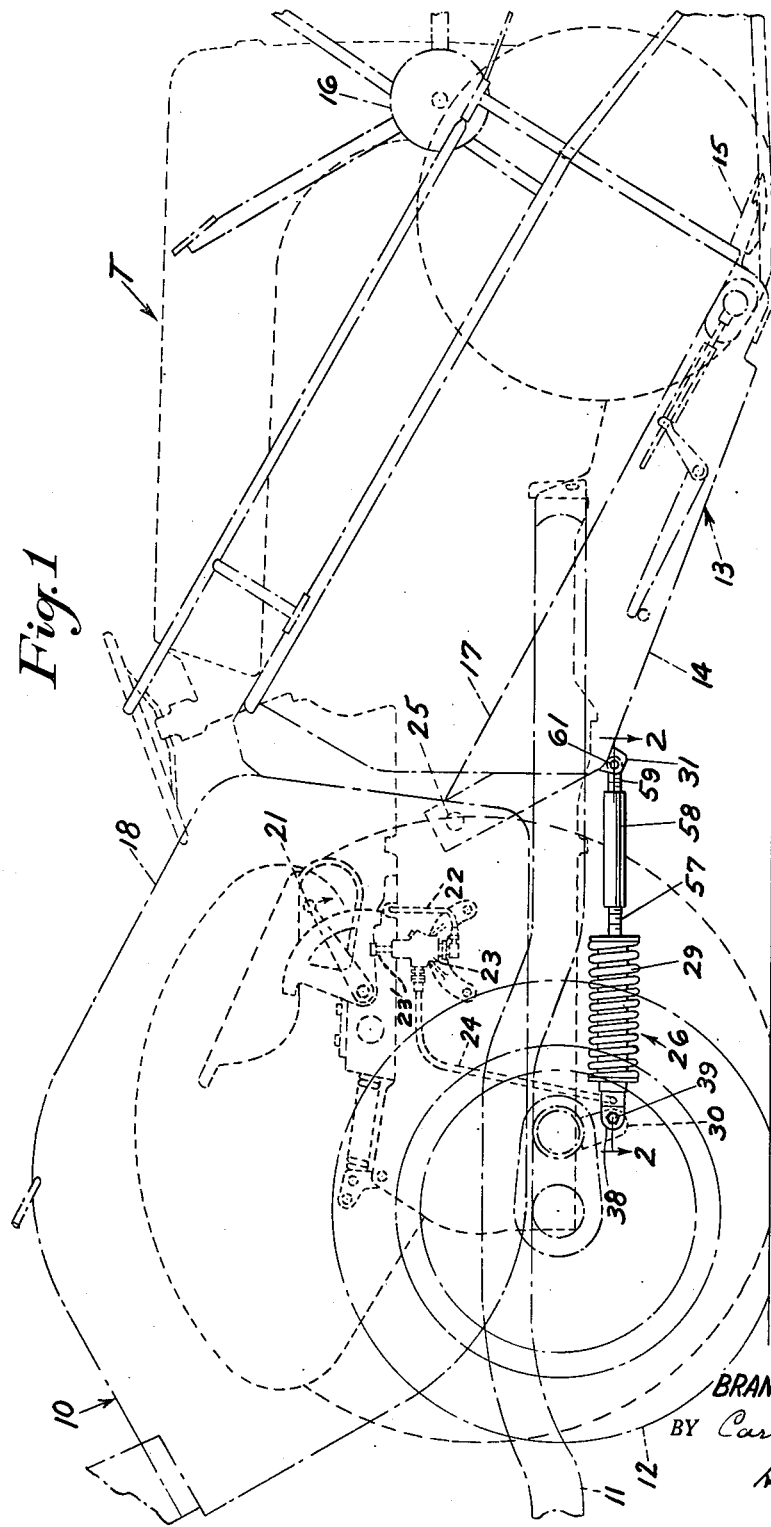

2,766,673

ADJUSTING MECHANISM FOR AGRICULTURAL IMPLEMENT PARTS

Brantford G. Elliott, Detroit, Mich., assignor to Harry Ferguson, Inc., Detroit, Mich., a corporation of Delaware Application September 29, 1951, Serial No. 248,930

3 Claims. (Cl. 97—46.59)

The invention relates to agricultural implements of the type having a header or comparable movable part requiring adjustment relative to ground level, and it is more particularly concerned with improved mechanism for effecting such adjustment.

One object of the invention is to provide power operated adjusting mechanism for implements of the above general character wherein a power actuator together with spring means for counterbalancing the weight of the adjustable part are incorporated in a unitary structure capable of being accommodated in a relatively small space and out of the way of the operating elements of the implement.

Another object is to provide an adjusting actuator and counterbalancing unit which is simple in construction, inexpensive to manufacture and which, moreover, is associated with the implement and the adjustable part thereof in a manner which permits substantial simplification of the implement structure.

Other objects and advantages of the invention will become apparent from the following detailed description of the preferred embodiment illustrated in the accompanying drawings, in which:

Figure 1 is a side view showing an adjusting mechanism embodying the features of the invention as applied to an agricultural implement coupled for operation with a hydraulically equipped tractor.

Fig. 2 is a longitudinal sectional view of the mechanism taken in a horizontal plane substantially on the line 2—2 of Fig. 1.

Fig. 3 is a transverse sectional view through the mechanism taken in a vertical plane substantially on the line 3—3 of Fig. 2.

Fig. 4 is a transverse sectional view through the mechanism taken in a vertical plane substantially in the line 4—4 of Fig. 2.

For purposes of illustration a preferred embodiment of the invention has been shown and will be described in detail. It is not intended that the detailed character of the disclosure should limit the invention to such particulars, but on the contrary it is intended to cover all modifications and alternative constructions falling within the spirit and scope of the invention as expressed in the appended claims.

For purposes of illustration the invention has been shown as applied to an implement 10 of the type adapted to be coupled in side by side relation with a tractor T. The exemplary implement includes a main frame 11 supported at one side on the tractor and at the other on an outboard wheel 12. Adjacent the front end of the implement frame 11 is a header 13 comprising a subframe 14 carrying a transversely disposed cutter bar 15, a reel 16 and gathering and transfer mechanism for conveying crop material from the cutter bar to the material treating mechanism of the implement enclosed within a housing structure 18. As the treating mechanism provided on the implement is of no particular concern to the present invention, it will suffice to note that in the case of a forage harvester such as that shown by way of example the treating means includes a rotatably driven cutter and feed rolls for transferring the material from the gathering means of the header to the cutter.

The exemplary tractor T will be recognized as a conventional lightweight agricultural tractor equipped with a hydraulic system of the type disclosed in the Ferguson Patent No. 2,118,180, issued May 24, 1938, modified to supply pressure fluid to an auxiliary implement mounted actuator, as shown in the copending application of Lester G. Kopp, Serial No. 149,738, filed March 15, 1950, now Patent No. 2,715,864. In such modified systems pressure fluid is supplied to the auxiliary operator from the pump of the tractor hydraulic system under control of a hand lever 21 conventionally known as the quadrant lever. The pressure fluid is directed to the auxiliary actuator by way of a conduit 22, valve 23 and conduit 24. The valve 23 is a check valve and it is normally operative to trap pressure fluid in the auxiliary actuator. To vent the auxiliary actuator and thus permit its return to retracted position by the load imposed thereon, the main valve of the tractor hydraulic system is shifted to "lowering" position and the valve 23 is opened. This is accomplished in one manual operation by locating the valve 23 so that the quadrant lever 21 when lowered, engages the operating element 23' of the valve.

In the operation of implements of the general type above described, it is sometimes necessary to change the position of the cutter bar 15 with respect to the ground in accordance with crop conditions or other considerations. To permit such adjustment the header frame 14 is pivotally supported adjacent its rear end as at 25 on the implement frame or housing 18 to swing about a horizontal axis.

The invention contemplates the use of the auxiliary pressure fluid supply system of the tractor for positioning the header 13 or other adjustable part of the implement with which it is associated. Accordingly, the adjusting mechanism constituting the invention includes a hydraulic actuator 26, herein shown as comprising a cylinder 27 (Fig. 2) and a piston 28, one of which is operatively connected to the implement frame and the other of which is operatively connected to the header frame. With this arrangement the header frame may be swung upwardly on its pivot 25 by introducing pressure fluid into one end of the cylinder 27. To minimize the force required to raise the header and thus enable it to ride easily over uneven ground or over obstacles on the ground, a spring 29 is provided for counterbalancing the same.

In accordance with the invention, the actuator 26 and counterbalancing means are constructed for assembly in a compact unitary structure capable of being accommodated in an out of the way place, such as below the implement frame 11. Such actuator construction is further advantageous by reason of the manner in which the operative connections with the implement and header frames are effected. Thus for connection with the implement frame 11 it is only necessary to provide a short rigid arm 30 depending from the under side of the frame. The connection with the header frame 14 requires on the latter only a pair of depending laterally spaced lugs 31.

Turning now to a more detailed description of the adjusting mechanism in its preferred form and referring particularly to Figs. 2, 3 and 4 of the drawings, it will be observed that the cylinder 27 is formed from tubular stock and is closed at one end by a plug 35 which may be telescopingly fitted into the cylinder 27 and secured thereto as by welding. The plug 35 shown is internally recessed as at 36 and provided at one side with a threaded opening for the accommodation of a fitting 37 by which the supply duct 24 is operatively connected with the closed end of the cylinder 27. The outer end of the plug 35 is bifurcated to provide two legs 38 spaced apart to straddle the arm 30 of the implement frame and for pivotal connection therewith by a fastening element such as a bolt 39 inserted through alined apertures in the legs and arm.

The piston 28 preferably comprises a cylindrical metal block having a piston rod 40 fixed thereto and extending from one end toward the open end of the cylinder. Clamped against the other end of the piston 28 by an annular plate 41 is a cup seal 42 of leather or other suitable material engageable with the walls of the cylinder 27 to prevent leakage of pressure fluid around the piston. The plate 41, piston 28 and piston rod 40 are secured together by means of a nut 43 threaded on the end 44 of the piston rod, which is reduced in diameter and inserted through alined axial openings in the piston and the plate. A sealing ring 45 seated in a groove in one end of the piston and coacting with the piston rod prevents leakage of fluid around the rod.

The piston rod 40 is supported and guided adjacent the open end of the cylinder 27 by a guide member 46 fixed within the cylinder and having a central bore slidably receiving the piston rod. The member is secured in place in the cylinder by means of snap rings 47 engaged in circumferential grooves of the cylinder wall at opposite sides of the member. To prevent entry of dirt or other foreign material around the piston rod, the member 46 is grooved for the reception of an annular scraper ring 48 which is held in place therein by a snap ring 49. A stop element 50 in the form of a sleeve is mounted on the piston rod between the piston 28 and guide member 46 to limit the forward movement of the piston to a predetermined position. A vent hole 51 in the member 46 permits flow of air into or out of the space between the guide member and the piston as the latter moves back and forth in the cylinder.

The operative connection between the piston and its piston rod and the header frame 14 is provided by an adjustable coupling mechanism including an abutment member in the form of a circular plate 55 supported and guided adjacent the forward end of the piston rod by a tubular member 56 telescopingly fitted over the actuator cylinder 27. Welded or otherwise secured to the plate 55 in alinement with the piston rod 40 is a stud 57 threaded into one end of a screw link 58 which has threaded into its other end a stud 59 terminating in a flat transversely apertured head 60. This head is adapted to fit between the lugs 31 of the header frame and to be pivotally secured thereto as by a bolt 61. It will be understood that the studs 57 and 59 and the cooperating ends of the link 58 are respectively formed with right and left hand threads so that the length of the link and consequently the effective length of the coupling means can be changed by turning the link in one direction or the other. Preferably the link 58 is square in cross section for convenient application of a wrench or other adjusting tool, and as herein shown the link is fabricated from tubular stock for economical production. The screw threads for the link are formed in suitable plugs 62 fitted into opposite ends of the link and welded or otherwise permanently secured in place.

To permit assembly of the counterbalance spring 29 with the actuator 26 as a unit, a coiled compression spring is utilized and is arranged to act between the fixed and movable implement parts through the same connections or coupling means through which the actuator acts on those parts. More particularly, the spring is coiled about the guide tube 56 and interposed between an abutment 65 provided on the cylinder 27 and the inner face of the abutment plate 55. The latter is made substantially larger in diameter than the guide tube 56 to which it is attached, so as to define an annular seat 66 for one end of the spring. The abutment 65 which provides a seat for the other end of the spring, may conveniently comprise an annular metal plate welded or otherwise rigidly secured to the cylinder 27 adjacent its closed end.

The spring 29 may be easily preloaded to exert a desired counterbalancing force by adjustment of the effective length of the coupling with the header frame. This is done by turning the link 58 to screw the lugs 57 and 59 in or out as required.

When installed in an implement and suitably connected with the hydraulic system of a tractor, the improved mechanism provides efficient and accurate adjustment of the movable implement part. Thus when the quadrant lever 21 of the tractor is advanced from neutral position, pressure fluid supplied through the valve 23 and duct 24 enters the closed end of the cylinder 27 and forces the piston 28 forwardly. The piston rod 40 by engaging the abutment plate 55 of the coupling means shifts the movable implement part accordingly. A minimum pressure is required for such adjustment, since the major portion of the weight of the implement part is carried by the counterbalance spring 29. The implement part is held in adjusted position by reason of the fact that the fluid is trapped in the cylinder 27 by the control valve 23 on the tractor. When this valve is opened by appropriate movement of the quadrant lever 21, the cylinder 27 is vented and the weight of the implement part acts to return the piston to its retracted position.

It will be apparent from the foregoing that the unitary character of the adjusting actuator and counterbalancing means affords a very compact structure. Moreover, the parts are simple in construction and may be manufactured and assembled at relatively low cost. Implement construction is also simplified since a single set of connections suffices for both the actuator and the counterbalancing means.

It will be noted further that the connecting elements required on the implement are of a very simple character. Furthermore, the elements are located on the under side of the implement frame and adjustable frame, where they are out of the way of the operating or other mechanisms of the machine.

I claim as my invention:

1. For use with an implement frame having a header frame mounted thereon for vertical adjustment, adjusting mechanism comprising a pressure fluid operated actuator including a cylinder pivotally connected at one end to one of the frames, a piston working in said cylinder and having a piston rod extending toward the other end of said cylinder, coupling means providing a one-way connection between said piston rod with the other of said frames comprising a rigid link pivotally connected at one end to the other frame, an abutment member at the other end of said link engageable by said piston rod, means supporting and guiding said abutment member on said cylinder for movement in a path parallel to the path of said piston, and spring means interposed between said cylinder and said abutment means for counterbalancing the weight of the frame to which said coupling means is connected, said one-way connection and said spring permitting limited movement of the frame while said piston remains stationary.

2. For use with an implement frame having a header frame mounted thereon for vertical adjustment, adjusting mechanism comprising a pressure fluid operated actuator including a cylinder pivotally connected at one end to one of the frames, a piston working in said cylinder and having a piston rod extending toward the other end of said cylinder, coupling means providing a one-way connection between said piston rod with the other of said frames comprising an abutment member, a tubular member rigid with said member telescopingly engaging said cylinder to support and guide the member in the path of said piston rod, a rigid link operatively connecting said member with the other of said frames, and a compression spring interposed between an abutment on said cylinder and said abutment member for counterbalancing the weight of said other frame.

3. A combined adjusting and counterbalancing mechanism comprising, in combination, a cylinder closed at one end and having an opening for admitting pressure fluid to said one end, apertured guide means mounted adjacent the other end of the cylinder, a piston working in said cylinder, a piston rod rigidly fixed to said piston and extending through said guide means toward the open end of the cylinder, coupling means including an abutment member movable relative to but engageable by the extended end of said piston rod in its movement responsive to the admission of fluid to the cylinder, a tubular member rigid with said abutment member and telescoped over the open end of said cylinder for supporting and guiding said abutment member, a fixed abutment adjacent the closed end of said cylinder, and a compression spring coiled about said tubular member with its opposite ends seating respectively against said fixed abutment and said abutment member so as to urge the latter in the direction that said piston is moved by pressure fluid.

References Cited in the file of this patent

UNITED STATES PATENTS

| | | |
|---|---|---|
| 2,200,392 | Goldberg | May 14, 1940 |
| 2,366,121 | Martin-Hurst | Dec. 26, 1944 |
| 2,410,918 | Acton | Nov. 12, 1946 |
| 2,527,823 | Karlsson | Oct. 31, 1950 |
| 2,639,022 | MacDonald | May 19, 1953 |
| 2,650,528 | Morgen | Sept. 1, 1953 |

FOREIGN PATENTS

| | | |
|---|---|---|
| 628,925 | Germany | Apr. 18, 1936 |